C. A. DAWLEY.
FLUID METER.
APPLICATION FILED FEB. 12, 1915.
1,238,498.
Patented Aug. 28, 1917.
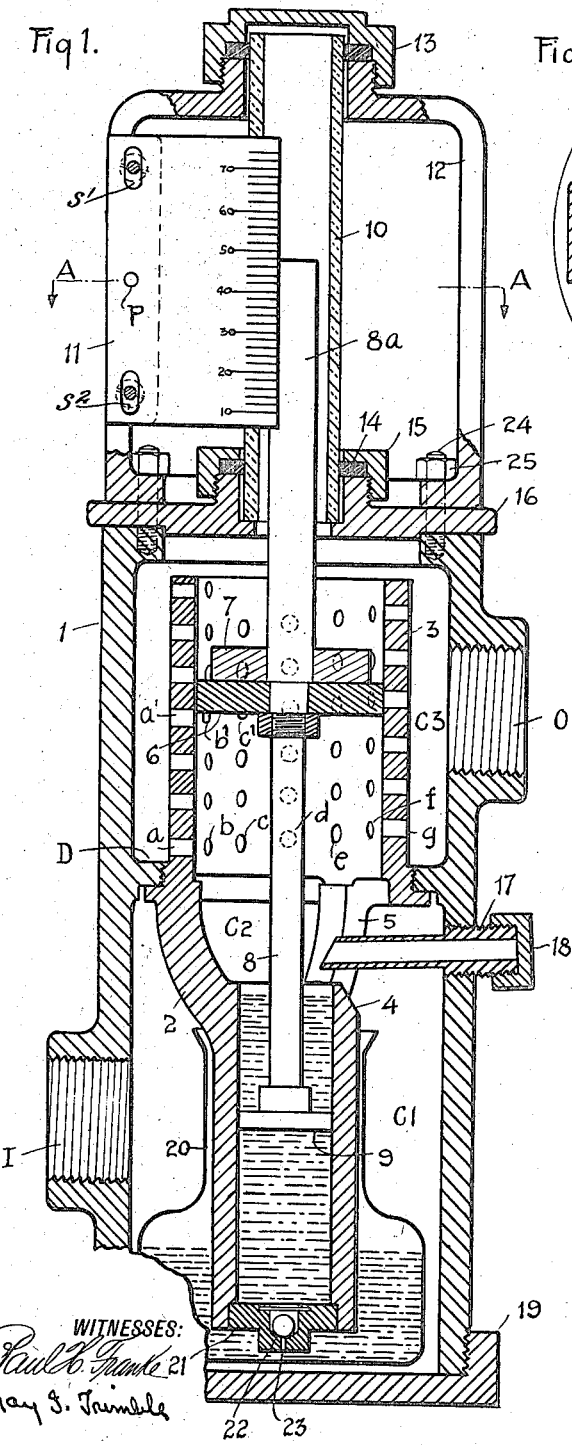
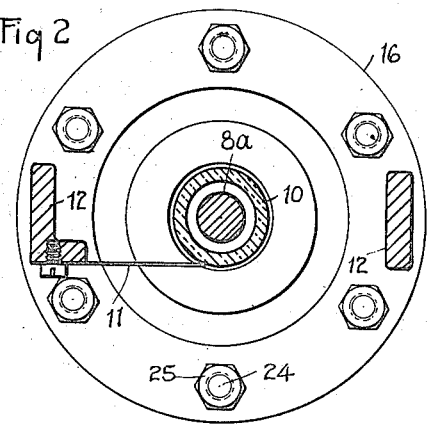
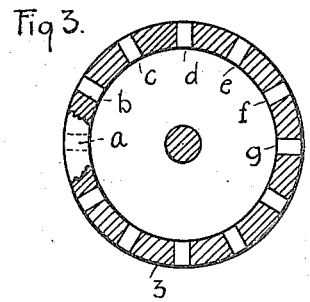
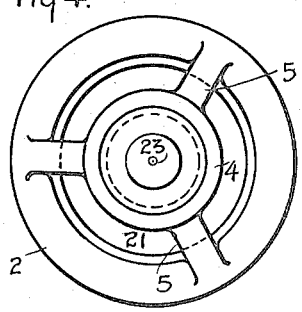
INVENTOR
Clarence A. Dawley
BY
ATTORNEYS

UNITED STATES PATENT OFFICE.

CLARENCE A. DAWLEY, OF PLAINFIELD, NEW JERSEY.

FLUID-METER.

1,238,498.  Specification of Letters Patent.  Patented Aug. 28, 1917.

Application filed February 12, 1915. Serial No. 7,689.

*To all whom it may concern:*

Be it known that I, CLARENCE A. DAWLEY, a citizen of the United States of America, and a resident of Plainfield, in the county of Union and State of New Jersey, have invented certain new and useful Improvements in Fluid-Meters, of which the following is a specification.

My invention relates to improvements in fluid meters and in particular to a direct-reading meter for indicating directly on a scale the rate of flow of fluid through the apparatus in cubic feet, gallons or other convenient unit.

The object of my invention is to provide a simple, rapid, convenient means for determining the rate of consumption of compressed air or steam used to actuate pneumatic tools, rock drills, steam pumps or other devices, also to indicate the rate of flow in pipes supplying fluid under pressure for any purpose. Various forms of meter have been used for accomplishing this result but in general these devices have been too complicated, cumbersome, expensive, uncertain and inaccurate and have required the use of complicated formulæ and the making of difficult observations of time and reduction of total quantities to a unit basis in order to give the normal rate of flow; which is the point usually desired to be ascertained in order to ascertain the relative economy of different designs of tools and the condition of such tools as to wear and other conditions which would be indicated by the consumption of motive fluid. Further objects are to provide a meter of simple construction, not liable to derangement, easy to construct, assemble, adjust or calibrate, free from distortion of working parts due to pressure or temperature; and other objects which will be more fully pointed out hereinafter.

In referring to this meter I shall refer to it as a compressed air meter or air meter, though it will be evident that it may be used for any gas or other fluid, including liquids, when properly calibrated to take account of the various densities of fluid which it may be desired to measure.

Referring to the drawings, Figure 1 shows a vertical section through the meter; Fig. 2 shows a horizontal section through the yoke and other parts at the line A—A; Fig. 3 shows a horizontal section of the metering cylinder 3, on the helical line of the perforations $a$, $b$, $c$, $d$, etc., and Fig. 4 is an end view from the bottom of the integral cylinder construction 2.

In the drawings, 1 designates a casing or body divided near its center by a wall D which separates the casing into two chambers $C^1$ and $C^3$. I is an inlet connection in free communication with chamber $C^1$ and O is an outlet connection in free communication with chamber $C^3$. 2 is a combined cylinder construction consisting of measuring cylinder 3 and dashpot cylinder 4, these cylinders being united into one integral part by means of webs 5. A piston 6 fits freely in cylinder 3 and piston 9 is an easy fit in cylinder 4. These two pistons are connected by a piston rod 8 and this rod is extended upward in an extension $8^a$ which travels inside the hollow sight glass 10, but without contact with the walls of said sight glass, the position of the top of rod $8^a$ thereby indicating the position of piston 6 in cylinder 3. Piston 6 is shown in Fig. 1 in a position about two thirds of its maximum rise. The bottom of the casing is closed by a cap 19 and the top is fitted with a cover 16 which in conjunction with the sight glass 10 and gaskets 14 and nuts 15 and 13, forms an inclosure for the fluid under pressure within the meter. The sight glass 10 is supported at its upper end by means of a yoke 12, which also carries the graduated plate 11. Nipple 17 is screwed into the casing so that its inner end is directly over the inner bore of cylinder 4, the purpose of this nipple being to feed oil into the dashpot cylinder 4. A cap 18 closes this nipple when not in use for introducing oil.

An oil reservoir 20 surrounds cylinder 4 and is preferably of the form shown, that is with a narrow neck loosely fitting around cylinder 4 so as to permit oil to run down on the outside of the cylinder 4 and be collected in reservoir 20. The lower part of 20 is enlarged to give a greater storage capacity and also for the purpose of retaining at least a part of its oil contents in case the meter should accidentally fall over into a horizontal position. At the top, reservoir 20 is flared out as shown to aid in collecting oil which may be spilled from cylinder 4 and also in order to deflect the flowing air outward so that any water or heavy scale or sediment contained in the air may be thrown against the interior of the casing and have an opportunity to drop down to the bottom.

The bottom of cylinder 4 is closed with a tightly fitted plug 21 which contains a ball valve 22 seated therein and capable of opening upward to admit oil from the reservoir 20 into cylinder 4. The ball seat is in communication with the oil reservoir 20 by means of a minute hole 23.

The operation of the meter will now be readily understood. Air or other fluid to be metered enters through the inlet opening I. This opening is directly in line with the cylinder 4 so that the impact of the air or other fluid, which may be moving at high velocity, is taken by the cylinder 4, or reservoir 20 which surrounds it closely, acting as a deflector to spread the flow of fluid throughout the chamber $C^1$ and giving the air a chance to change direction easily and flow through the spaces between the webs 5 into the chamber $C^2$ beneath the piston 6. Piston 6 has a superimposed portion 7 preferably made separate from part 6 in order that the weight may be changed readily by the use of weights of different diameters, heights, or of metals of differing specific gravities, so that the total weight of the moving element may be readily changed by merely changing part 7. Cylinder 3 is perforated with a number of holes, certain of which are shown in section and others of which $b$, $c$, $d$, $e$, $f$, are shown in projection. These holes are preferably arranged in helical paths around the circumference of cylinder 3 and equally spaced, angularly, as shown in section in Fig. 3. It will be seen that in order that air may pass from chamber $C^2$ to chamber $C^3$ it must pass through these small holes and it is further evident that the number of holes exposed so as to be available for this flow, is determined by the height of piston 6 in cylinder 3. A small difference of pressure between chamber $C^2$ and $C^3$ will be necessary to cause flow and this difference of pressure will act on the area of piston 6 and when sufficient will cause piston 6 and its connected parts to rise vertically. Piston 9 working in cylinder 4 will retard the rate at which piston 6 will rise and prevent violent motion or oscillation of the moving element. It is evident that as soon as the rate of flow is established at normal and the pressure difference in chambers $C^2$ and $C^3$ is just sufficient, acting on area of piston 6, to sustain the weight of the moving element, the piston will come to rest. As the flow of air is directly proportional to the effective area of flow as determined by the number of holes $a$, $b$, $c$, etc., which are uncovered by the lower edge of piston 6, and as the holes are disposed so that equal increments of rise of piston 6 uncover a proportional number of holes, it follows that the height of rod $8^a$ as observed in the gage glass 10 is a direct measure of the volume flowing per minute or the rate of flow. The scale 11 which is fixed against the exterior of sight glass 10 enables the height of $8^a$ to be read off directly. It will be seen that all of the holes fully uncovered by piston 6 have an equal value in permitting air flow as all are of the same shape and size and the flow is therefore directly proportional to the number of holes uncovered. Directly under the edge of piston 6 there are a few holes which are only partly uncovered as indicated by $a'$, $b'$, $c'$. The uncovered parts of these holes are segments of circles and in passing from the elevation of center of one hole to that of the center of the adjacent hole, the change of area exposed is not precisely proportional to the rise of the piston, but as the vertical distance from the center of one hole to the center of the adjacent hole is very slight, the theoretical error is too small to be observed. In passing from the center of one hole to the center of the adjacent hole, parts of several holes are exposed which in the aggregate are exactly equal to one full hole, so that from the center line of hole to hole, the meter will indicate exactly in proportion to the flow.

Cylinders 3 and 4 being cast in one part and machined at one setting, insures exact alinement of the bores; and the external thread on cylinder 3 together with the shoulder directly beneath it, are also finished at the same setting. The thread and seat in casing 1 are machined at one setting at the same time as the bore and facing at the top of casing are made. This insures that cover 16 will be exactly in line with the cylinders and that rod $8^a$ will be exactly central and so will travel in sight glass 10 without contact or friction. The two pistons 6 and 9 with the connecting piston rod 8 form together a single moving element, which is guided in its axial movement by the two cylinders 3 and 4, both formed in a single piece, as already stated; and bored at one setting so that they are exactly in line. This construction constitutes a means for guiding the moving member 6—8—9 which permits very close fit of the pistons with great freedom of movement of the pistons. In fact, so free are the pistons that in the operation of the device it is observed that the structure 6—8—9 rotates, such rotation being probably due to a slight rotary motion of the air currents passing out through the lateral openings in cylinder 6. This rotation is of advantage, since, because the piston is in motion, friction of rest (which is greater than friction of motion) need not be overcome when, through varied rate of flow, the position of the piston structure changes.

The meter is consequently very sensitive in indicating slight changes in the rate of flow as the moving element is practically floated frictionlessly when the meter is set in a vertical position.

As before mentioned, the portion 7 of the piston is interchangeable so that it may be selected in accordance with the specific gravity or other controlling quality of the fluid to be measured and to conform to a standard graduation of scale, thereby obviating the necessity of making special graduations for each meter. To further provide for adjustment of the meter and to offset any slight inaccuracies in dimensions of the parts, the graduated plate 11 is provided with slots $s^1$ and $s^2$ so that the plate can be set to show the same reading as another standardized meter connected in series with the one which is being adjusted. After the scale plate is located to give the same reading as the standard instrument at a low rate of flow, a fixed pin $p$ or a screw is put through the scale plate into the yoke for permanently fixing the position of the scale plate.

When no flow is taking place the weight of the moving element will overcome the resistance of the dashpot piston and piston 6 will sink until it rests on the ledges or shoulders formed at the top of the webs 5. As there is a small clearance space between piston 6 and cylinder 3, there is always a small constant leakage space around the piston. Furthermore the indication of the meter or the area of holes exposed will not be proportional to the rise of piston until the center line of the lowest hole has been reached by the lower edge of the piston. Consequently the first reading on the dial will not be at zero but at some small value representing 5 to 10% of the capacity of the meter. The adjustability of the scale plate is consequently of service in taking account of any variation between different individual meters in respect to the leakage areas around the piston as well as taking account of inaccuracies in dimensions of parts and location of the first hole in cylinder 3.

Piston 9 working in cylinder 4 is submerged in oil or other suitable liquid and acts merely to steady the travel of piston 6 so that it will not oscillate about its position of equilibrium as it would otherwise do on account of being a free and practically frictionless fit in its cylinder. The fluid utilizing device or tool which is connected to outlet O, usually takes a pulsating flow of air which, if reflected instantly on piston 6, would cause it to fluctuate up and down rapidly making it difficult to take a reading of the average height, but by retarding this tendency to move by means of dashpot 4, a steady reading is obtained which represents the average of the pulsating flow.

I have found in the use of this meter that under certain conditions when the meter is connected in a supply line and no air is flowing, so that the pistons 6 and 9 have dropped to their lowest position and all of the holes $a$, $b$, $c$, etc., in cylinder 3 are closed off from communication with chamber $C^1$, a very sudden rush of air due to rapid opening of a tool valve or other cause, may cause piston 6 to rise for a part of its travel with such suddenness as to throw some of the dashpot oil over the top edge of cylinder 4 instead of bypassing it to the opposite side of piston 9. The ball check 22 in communication with reserve oil in reservoir 20 will in this event admit more oil into the bottom of cylinder 4 to replace that spilled over the top, and the flared top of reservoir 20 will catch the overflowed oil and collect it in the reservoir 20 for further use. Hole 23 is of such size as to permit a gradual flow of oil when piston 9 is tending to move upward and thereby tends to accelerate the arrival of the moving element at the point of equilibrium so that a reading of the rate of flow may be taken more promptly after the air is first turned on. The use of the check valve and reservoir also insures the maintenance of a full cylinder of oil in the dashpot.

The yoke 12 and cover 16 for the outlet chamber $C^3$ are connected by screw studs 24 provided with the usual screw nuts 25. By removing these nuts 25, the yoke 12 and cover 16 may be lifted off, together with the sight tube 10, thus permitting easy removal of the connected pistons 6 and 9 without disturbing the sight tube 10 and without disturbing the adjustment of the scale 11. This makes it possible to take the meter apart for cleaning without occasion for readjustment after reassemblage.

What I claim is:

1. A fluid meter comprising in combination a casing having inlet and outlet connections, and a ported cylinder therebetween and in the line of flow from said inlet to said outlet, a piston within said cylinder exposed to the pressure of fluid flow from the inlet to the outlet, and arranged in its travel under the influence of such pressure to uncover and open such cylinder ports in succession, a dash pot cylinder in line with the before mentioned cylinder, and a piston within said dash pot cylinder and connected to said before mentioned piston to form therewith a single moving element, such moving element being guided in axial movement by the cylinders in which said pistons move.

2. A fluid meter comprising in combination a casing having inlet and outlet connections, and a ported cylinder therebetween and in the line of flow from said inlet to said outlet, a piston within said cylinder exposed to the pressure of fluid flow from the inlet to the outlet, and arranged in its travel under the influence of such pressure to uncover and open such cylinder ports in succession, such ports arranged in a helical path, a dash pot cylinder in line with the before mentioned cylinder, and a piston within said dash pot cylinder and connected to said before mentioned piston to form therewith a single moving element, such moving element being guided in axial movement by the cylinders in which said pistons move.

3. A fluid meter comprising in combination a casing having inlet and outlet connections, and a ported cylinder therebetween and in the line of flow from said inlet to said outlet, a piston within said cylinder exposed to the pressure of fluid flow from the inlet to the outlet, and arranged in its travel under the influence of such pressure to uncover and open such cylinder ports in succession, such ports arranged in a plurality of turns of a helical path, a dash pot cylinder in line with the before mentioned cylinder, and a piston within said dash pot cylinder and connected to said before mentioned piston to form therewith a single moving element, such moving element being guided in axial movement by the cylinders in which said pistons move.

4. A fluid meter comprising a casing having an inlet chamber and an outlet chamber, a ported measuring cylinder disposed functionally between said chambers, a piston within said cylinder and exposed to the pressure of fluid flow from the said inlet chamber to the said outlet chamber, and arranged in its travel under the influence of such pressure to uncover and open such cylinder ports in succession, a dash pot cylinder in line with the before mentioned cylinder, and a piston within said dash pot cylinder and connected to said before mentioned piston to form therewith a single moving element, such moving element being guided in axial movement by the cylinders in which said pistons move.

5. A fluid meter comprising a casing having an inlet chamber and an outlet chamber, a ported measuring cylinder disposed functionally between said chambers, a piston within said cylinder and exposed to the pressure of fluid flow from the said inlet chamber to the said outlet chamber, and arranged in its travel under the influence of such pressure to uncover and open such cylinder ports in succession, such ports arranged in a helical path, a dash pot cylinder, in line with the before mentioned cylinder, and a piston within said dash pot cylinder and connected to said before mentioned piston to form therewith a single moving element, such moving element being guided in axial movement by the cylinders in which said pistons move.

6. A fluid meter comprising a casing having an inlet chamber and an outlet chamber, a ported measuring cylinder disposed functionally between said chambers, a piston within said cylinder and exposed to the pressure of fluid flow from the said inlet chamber to the said outlet chamber, and arranged in its travel under the influence of such pressure to uncover and open such cylinder ports in succession, such ports arranged in a plurality of turns of a helical path, a dash pot cylinder in line with the before mentioned cylinder, and a piston within said dash pot cylinder and connected to said before mentioned piston to form therewith a single moving element, such moving element being guided in axial movement by the cylinders in which said pistons move.

7. A fluid meter comprising a casing having an inlet and an outlet chamber, a measuring cylinder within the outlet chamber, a piston in said measuring cylinder, means for permitting flow of fluid from the interior of said measuring cylinder to said outlet chamber, said means controlled by the piston in said measuring cylinder, a dash pot cylinder within said inlet chamber and a piston in the dash-pot cylinder, such piston being connected with the piston of the measuring cylinder to form a single unitary movable member guided by the cylinders in which such pistons move.

8. A fluid meter comprising a casing, a combined measuring cylinder and dash-pot cylinder within the casing, such measuring and dash-pot cylinders being integral and connected by webs, pistons in the cylinders and a rod connecting the pistons, and ports in the measuring cylinder adapted to be uncovered by the piston thereof, such ports arranged so that the port area exposed is proportional to the rise of the pistons.

9. A meter comprising a chamber and a dash-pot cylinder therein so located as to receive the impact of the entering fluid and distribute it throughout the inlet chamber, and a measuring cylinder integral with dash-pot cylinder and connected thereto by webs, the space between said webs constituting ports for free flow of fluid from the inlet chamber to the interior of the measuring cylinder.

10. A fluid meter comprising a casing having an inlet chamber and an outlet chamber, a measuring cylinder disposed functionally between said chambers, a dash-pot within one of said chambers and exposed inside and outside to pressure, and connected pistons, one within said measuring cylinder and the other within said dash-pot.

11. A fluid meter comprising a casing having an inlet chamber and an outlet chamber, a measuring cylinder disposed functionally between said chambers, a liquid container comprising a dash-pot, connected pistons within said dash-pot and measuring cylinder respectively, and means for the supply of liquid to said liquid container.

12. A fluid meter comprising a casing having an inlet chamber and an outlet chamber, a measuring cylinder disposed functionally between said chambers, a liquid container located in one of said chambers and comprising a dash-pot, said liquid container exposed to pressure inside and outside, connected pistons within said measuring cylinder and dash-pot respectively, and means for the supply of liquid to said liquid container, projecting through the wall of that chamber of the casing in which such liquid container is located.

13. A fluid meter comprising a casing having an inlet chamber and an outlet chamber, a measuring cylinder disposed functionally between said chambers, a dash-pot within one of said chambers, a liquid reservoir surrounding said dash-pot, a non-return valve interposed between said dash-pot and reservoir, and permitting flow from the reservoir into the dash-pot, but preventing reverse flow, and connected pistons within said dash-pot and measuring cylinder.

14. A fluid meter comprising a casing having an inlet chamber and an outlet chamber, a measuring cylinder disposed functionally between said chambers, a dash-pot within one of said chambers, a liquid reservoir surrounding said dash-pot, a non-return valve interposed between said dash pot and reservoir, and permitting flow from the reservoir into the dash-pot, but preventing reverse flow, said reservoir having an enlarged body portion and a contracted neck, whereby liquid will be contained within the reservoir in the event of overturning of the structure, and connected pistons within said dash-pot and measuring cylinder.

15. A fluid meter comprising a casing having an inlet chamber and an outlet chamber, a measuring cylinder disposed functionally between said chambers, one of said chambers being open at the end, a cover for such open end having a sight tube, a closure for the distant end of such sight tube and a support therefor, means for holding together the said support, the said cover, and the casing, and a piston within said measuring cylinder provided with indicating means extending into the sight tube.

16. A fluid meter comprising a casing having an inlet chamber and an outlet chamber, a measuring cylinder disposed functionally therebetween, a dashpot, pistons in said measuring cylinder and said dashpot respectively, a piston rod connecting said pistons and extended upward above the top of said casing, and a sight glass surrounding such extended rod and means for preventing escape of fluid from said sight glass.

17. A fluid meter comprising a casing having an inlet chamber and an outlet chamber, a measuring cylinder disposed functionally between said chambers, one of said chambers being open at the end, a cover for such open end having a sight tube, a closure for the distant end of such sight tube and a support therefor, means for holding together the said support, the said cover, and the casing, and a piston within said measuring cylinder provided with indicating means extending into the sight tube, the opening at the end of said open chamber being of greater diameter than the said piston, whereby, upon the removal of the said support and cover the piston may be removed.

18. A fluid meter comprising a casing having an inlet chamber and an outlet chamber, a measuring cylinder disposed functionally between said chambers, one of said chambers being open at the end, a cover for such open end having a sight tube, a closure for the distant end of such sight tube and a support therefor, a graduated scale carried by said support, means for holding together the said support, the said cover and the casing, and a piston within said measuring cylinder provided with indicating means extending into the sight tube, the opening at the end of said open chamber being of greater diameter than the said piston, whereby, upon the removal of the said support and cover the piston may be removed, and whereby the parts may be reassembled without occasion for readjustment.

In testimony whereof I have signed this specification in the presence of two subscribing witnesses.

CLARENCE A. DAWLEY.

Witnesses:
H. M. MARBLE,
PAUL H. FRANKE.